United States Patent [19]

Comune

[11] Patent Number: 4,563,491
[45] Date of Patent: Jan. 7, 1986

[54] STUCCO COATING COMPOSITION

[76] Inventor: Michele Comune, 159 Garside St., Newark, N.J. 07401

[21] Appl. No.: 485,163

[22] Filed: Apr. 15, 1983

[51] Int. Cl.$^4$ ............................................. C08L 3/02
[52] U.S. Cl. .................................... 524/47; 524/413; 524/425; 524/432; 524/492; 427/403
[58] Field of Search ................ 524/47, 413, 425, 432, 524/492; 106/109, 111, 114, 116; 427/403

[56] References Cited

U.S. PATENT DOCUMENTS

| | | | |
|---|---|---|---|
| 3,998,769 | 12/1976 | Lane et al. | 524/47 |
| 4,111,868 | 9/1978 | Ficken | 524/47 |
| 4,251,578 | 2/1981 | Kaufmann | 428/159 |
| 4,287,103 | 9/1981 | Francis et al. | 524/47 |

Primary Examiner—John Kight
Assistant Examiner—Nathan M. Nutter
Attorney, Agent, or Firm—Rohm & Monsanto

[57] ABSTRACT

A composition of the type which is applied to a surface for protecting it against environmental influences and for producing an aesthetic effect. The composition is particularly suited for being applied with a trowel to form a textured surface, such as stucco, or for being sprayed onto a surface. Baking flour is mixed into a paste-like mixture with water and added to a latex sealer paste. Sand, preferably of a coarse grade, is then added to the mixture. The mixture can then be provided with filler compounds, such as calcium carbonate, and a pigment, such as titanium dioxide. The mixture has been shown to be effective against a variety of adverse environmental influences, including ultraviolet radiation, humidity, salt spray, fire, and thermal effects.

18 Claims, No Drawings

STUCCO COATING COMPOSITION

BACKGROUND OF THE INVENTION

This invention relates generally to construction materials, and more particularly, to a stucco coating composition, and method for preparing same, which is easily applied by any of severl known techniques, and which is durable against environmental effects.

Conventional stucco materials and plastering compositions are difficult to apply, using conventional troweling techniques, so as to achieve a durable surface coating which adheres well to the surface on which it is applied and which produces the desired, aesthetically pleasing surface texture. For this reason, highly skilled artisans required if a stucco surface which has the appearance of being professionally applied is to be produced. Known stucco compositions must have a soft, or somewhat watery, texture if good adhesion to the surface on which it is applied is to be achieved. However, a soft textured composition is not easily applied by conventional troweling techniques because it slides off of the trowel before it can be applied to a horizontal surface, such as a wall, and then does not produce the desired surface texture when dry.

As an alternative to the soft textured compositions mentioned above, the prior art has produced acceptable surface textures by using conventional compositions having a firmer consistency. As intimated hereinabove, such a firm composition does not provide adequate adhesive characteristics, thereby requiring a lathing or wire mesh to be applied to the surface prior to the application of the stucco composition. Clearly, this approach requires substantial preparation and is, therefore, quite costly in terms of materials and labor.

It is a further problem with known stucco compositions that they are adversely affected by the weather and environmental conditions. For example, some stucco compositions tend to fade, soften, or crack after a relatively short period of exposure to ultraviolet radiation, elevated temperature, and high humidity. Such known compositions are also adversely affected by salt spray, and tend to absorb excessive amounts of water when subjected to extended periods of rain.

It is, therefore, an object of this invention to provide an inexpensive stucco composition which is easily applied by any of several known techniques, including troweling, spraying, and rolling.

It is a further object of this invention to provide a stucco composition which adheres well to the surface on which it is applied, notwithstanding that it is applied while it has a sufficiently firm consistency to be easily applicable with a conventional trowel.

It is yet a further object of this invention to provide a stucco composition which does not require extensive preparation of the surface to which it is to be applied, such as by coating with a sealant or by applying lathing or wire mesh.

It is another object of the invention to provide a stucco composition which is resistant to the effects of the weather, including freezing during application.

It is still a further object of this invention to provide a coating material which can withstand direct sunlight, elevated temperature, and high humidity for extended periods.

It is still another object of this invention to provide a coating material which is resistant to salt spray.

SUMMARY OF THE INVENTION

The foregoing and other objects are achieved by this invention which provides a coating composition consisting of a latex sealer, a mineral aggregate, filler compounds, and a paste of baking flour.

In a practical embodiment of the invention, a latex sealer sold under the tradename UCAR (Nos. 505/515) (trademark of Union Carbide) has been used. Sand has been used as the mineral aggregate. In a preferred embodiment, a coarse grade of sand is used. As a filler, calcium carbonate ($CaCO_3$) has been used with good results. The mean particle size of the mineral aggregate is therefore substantially larger than that of the filler. In a specific, particularly advantageous embodiment of the invention, a limited quantity of titanium dioxide ($TiO_2$) has been used to enhance the white color of the present composition.

In accordance with a method aspect of the invention, UCAR latex is prepared as a paste. Baking flour is also prepared as a paste, and mixed with the UCAR Nos. 505/515 brank latex paste. A minor proportion of the mineralized aggregate material, illustratively sand, is added to the mixture of latex and flour, and mixed well. Subsequently, at least one filler compound, illustratively calcium carbonate, is added to the mixture of latex, flour and mineral aggregate. In a particularly advantageous embodiment of the invention, a small amount of titanium dioxide is added to the mixture. The remaining sand is added to the mixture and the mixing is continued until a uniform composite is formed. The consistency and texture of the mixture may be adjusted by the addition of more sand or water. It is preferred that the mixing be performed at a relatively slow speed, such as is conveniently achieved by a portable cement mixer.

DETAILED DESCRIPTION OF THE INVENTION

A five gallon mixture of the composition according to the invention can be prepared in accordance with the following specific illustrative embodiment wherein the ingredient amounts are given in the units in which they are most conveniently measured:

| Ingredient | Amount |
| --- | --- |
| UCAR brand latex (Nos. 505/515) | 1¼ gal. |
| Baking flour Paste | 7 oz. |
| Sand (course grade) | 40 lb. |
| Calcium Carbonate | 10 lb. |
| Titanium Dioxide | 2 lb. |
| Water | up to 3 oz., optional |
| Stone | 7½ lb., optional |

A latex sealer is the base of the protective coating composition according to this invention. Latex sealers are known in the art and are commercially procurable. A latex sealer, manufactured by Union Carbide under the registered tradename UCAR, has been found to give good results. In a preferred embodiment, UCAR Nos. 505/515 brand latex is used. UCAR Nos. 505/515 brand latex each comprises a mixture of vinyl chloride monomer, vinyl acetate monomer, and butyl acrylate monomer, in varying proportions along with surfactants to reduce foaming and increase drying time. The specific proportions are not critical to the practice of the invention.

Regular baking, or wheat-based flour, is prepared as one would prepare a glue of such flour in a mixture of approximately one part flour to four parts water. In a preferred embodiment, a half cup of flour is made into a paste with two cups of water by the following method. The water is brought to a boil and then allowed to stand at room temperature for a few minutes so that it is warm, but not hot (about 150° F., for example). The flour is stirred into the warm water and the mixture is heated to a boil for about 5 minutes. The boiled mixture is cooled slightly before being added to the latex. In the specific illustrative embodiment shown above, about 7 oz. of the prepared flour paste is combined with about 1¼ gal. UCAR Nos. 505/515 brand latex sealer.

I have found that the addition of the baking flour paste is essential to create a composition having the desired workability. In an experimental composition, the absence of the flour paste resulted in a composition having a firmer consistency which would not stay on the trowel and which would not be susceptible to spraying or rolling onto a surface with ease.

A mineral aggregate, typically sand, forms the bulk of the composition. Quartz stone may be added, if desired, to give a pleasing aesthetic effect to the surface. Sand having particle sizes greater than ⅛ inch is generally considered to be coarse grade, and is preferred if a rough surface finish is desired. However, finer grades of sand would be acceptable and would produce different aesthtic effects which may be desired in certain circumstances. It should be noted, however, that the amount of latex sealer must be increased when finer grain sand is used. It should also be noted that the average particle size of the mineral aggregate affects the surface area coverage of the final product. The larger the average particle size, the less area that can be covered with a given quantity of coating composition. In the specific illustrative embodiment described herein, about 40 pounds of sand and about 7½ pounds of quartz stone were used. The total weight of a five gallon unit of the coating composition in accordance with the invention is approximately 70 pounds.

The quantity and composition of the filler ingredients and pgiments can be varied as required to produce certain results. In the specific illustrative embodiment herein described, a preferred filler is calcium carbonate because it is relatively inexpensive. Zinc oxide can be used, either alone or in combination with calcium carbonate, to retard drying time and to act as a whitening agent or pigment. A whitening agent is necessary to make the composition opaque. Titanium dioxide is the preferred whitening agent. However, I have discovered that it is important not to add too much titanium dioxide as this results in a final composition which is brittle upon drying and which does not exhibit the desired durability against the effects of the weather.

Commercially procurable pigments can be added, in such quantities as required, to give the composition the desired color. Examples of pigments which have been used sucessfully in the composition are: universal tinting colors available from Benjamin Moore and Color Trend pigments available from Tenneco Chemicals.

The mixture is water soluble, and hence, additional water may be added to adjust the consistency of the product. In certain circumstances, such as when application is to occur in very cold weather, another solvent, such a ethylene glycol, may be substituted for water to prevent freezing. To obtain a thicker consistency, additional sand or stone may be added.

The method for preparing this composition basically entails the following procedure. The flour paste is prepared as described above. Then the flour paste is combined with the latex and slowly mixed in a rotatable mixing chamber. A portable cement mixer has been used with good results. About one quarter of the mineral aggregate is added to the latex-flour paste mixture to aid in mixing the dry ingredients. Then, the filler ingredients and pigments are added, one ingredient at a time, while mixing continues; each being thoroughly commingled with the mixture before the addition of the next. Finally, the remainder of the sand is added with continued mixing. Additional water or solvent may be added to obtain the desired consistency. Quartz stone may be added at this point for aesthetic effect.

The proportions of the stone and solvent are adjustable by the processor or the workmen to obtain the consistency required. The consistency of the product can be tested quite simply on a trowel. It is preferred that the composition have a consistency such that it remains on a trowel for at least eight seconds. This affords a sufficient time to apply the composition to a surface to be coated. It is preferrable that the composition remain on the trowel, however, for about 20 to 30 seconds. A thinner consistency is required for spraying or rolling the composition. The composition according to this invention can be applied over any surface, including metal, without any special preparation such as priming with a sealer, and without requiring lathing or a wire mesh framework. The composition typically dries in 3–4 hours depending on the ambient humidity. As discussed above, drying can be retarded by the addition of zinc oxide.

The subject stucco composition has been subjected to a variety of environmental tests. In the first test, the composition was applied as a coating over a number of ceramic tiles. The coating was applied to the unglazed side of the tile, and was allowed to dry at room temperature for approximately forty-eight hours. At the end of the forty-eight hours, the coating was subjected to a weather test which included ultraviolet radiation, and a temperature of 115 degrees Fahrenheit at 80 percent relative humidity for 1000 hours. After the end of 1000 hours, the coating mixture, which had a light tan color prior to the test, showed no color fading, softening, cracking, spalling (chipping or flaking) or crazing (fine hair line cracks). In addition, the environmental stress applied to the coating did not cause any surface degradation.

In a second test, several of the coated tiles were placed in a salt spray chamber and subjected to salt spray for approximately 700 hours. At the end of the 700 hours, the coatings on the tiles did not change color, soften, crack, spall, or craze. Moreover, no surface degradation was evident.

Several of the tiles were immersed in room temperature water for approximately forty-eight hours. Upon being removed from the water, the tiles were blotted dry and it was found that the coating absorbed approximately four percent of water. The tiles were then dried in a circulating hot air oven for sixteen hours at approximately 180 degrees Fahrenheit. The coating showed no evidence of deterioration following either treatment.

The stucco coating was then subjected to a thermal shock test. First, the coated test tiles were immersed in room temperature water for five hours, then three hours at 10 degrees Fahrenheit and then sixteen hours at 140 degrees Fahrenheit. This cycle was repeated five times.

At the end of the five cycles, the stucco coating was examined and there was no indication of any change in color, softening, cracking, spalling, crazing, or any other surface deterioration.

The coating was subjected to a flamability test which entailed holding the coating directly in the flame of a Bunsen Burner. There was no evidence of flamability for the first seven minutes. Thereafter, there was evidence of a very slight degree of flamability. More importantly, however, the stucco composition showed a self-extinguishing flamability characteristic.

Although the invention has been described in terms of specific embodiments and applications, persons skilled in the art, in light of this teaching can generate additional embodiments without departing from the spirit or exceeding the scope of the claimed invention. Accordingly, the descriptions herein are to facilitate comprehension of the invention, and should not be construed to limit the scope thereof.

What is claimed is:

1. A composition for a protective surface coating which resists water and heat in an outdoor environment, the composition consisting essentially of:
   (a) latex sealer in an amount of approximately 1.25 gallons per each 5 gallons of the composition;
   (b) flour paste in an amount of approximately 7 ounces per each 5 gallons of the composition;
   (c) mineralized aggregate in an amount of approximately at least 40 lbs. per each 5 gallons of the composition;
   (d) at least one filler material in an amount of approximately at least 10 lbs. per each 5 gallons of the composition; and
   (e) water in an amount of up to 3 ounces.

2. The composition of claim 1 further comprising a pigment for coloring said composition.

3. The composition of claim 1 wherein said at least one filler material comprises calcium carbonate.

4. The composition of claim 3 wherein said at least one filler material further comprises titanium dioxide.

5. The composition of claim 3 wherein said at least one filler material further comprises zinc oxide.

6. The composition of claim 1 wherein said at least one filler material comprises zinc oxide.

7. The composition of claim 1 wherein said mineralized aggregate is sand.

8. The composition of claim 7 wherein said sand is of a coarse grade.

9. The composition of claim 1 further comprising quartz stone.

10. A composition for a protective surface coating which resists water and heat in an outdoor environment, the composition consisting essentially of:
    (a) a liquid latex sealer in an amount of approximately 1.25 gallons per each 5 gallons of the composition;
    (b) a paste of baking flour and water in approximately a 1:4 part mixture in an amount of approximately 7 ounces per each 5 gallons of the composition;
    (c) sand of a coarse grade in an amount of approximately at least 40 lbs. per each 5 gallons of the composition;
    (d) calcium carbonate in an amount of approximately at least 10 lbs. per each 5 gallons of the composition; and
    (e) titanium dioxide in an amount of approximately 2 lbs. per each 5 gallons of the composition.

11. A composition for a protective surface coating which resists water and heat in an outdoor environment, the composition consisting essentially of approximately 5 parts by weight of a mineralized aggregate; approximately 1 part by weight of calcium carbonate; approximately 0.75 part by weight of a liquid latex sealer; approximately 0.25 part by weight of titanium dioxide; and approximately 0.05 part by weight of a paste of flour and water.

12. The composition of claim 11 wherein said mineralized aggregate comprises sand.

13. The composition of claim 12 wherein said mineralized aggregate further comprises quartz stone.

14. A method of producing a protective surface coating mixture which resists water and heat in an outdoor environment, the method comprising the steps of:
    (a) forming a paste of flour and water;
    (b) mixing approximately 7 ounces of said flour paste with approximately 1.25 gallons of a liquid latex sealer for each 5 gallons of the coating;
    (c) mixing a minor proportion of an amount of approximately at least 40 lbs. of a mineralized aggregate into said flour paste and latex sealer mixture, for each 5 gallons of the coating;
    (d) mixing at least one filler material into the mixture produced by the preceding steps, each of said at least one filler material being added sequentially; and
    (e) mixing the remaining major portion of said mineralized aggregate into the mixture produced by the preceding steps.

15. The method of claim 14 wherein the step of forming a paste of baking flour and water comprises the steps of:
    heating four parts water;
    stirring one part flour into said heated water; and
    boiling the flour and water mixture for a period of time.

16. The method of claim 14 where there is provided the further step of:
    mixing additional water into the mixture produced in step (e).

17. The method of claim 14 where there is provided the further step of:
    mixing additional mineral aggregate into the mixture produced in step (e).

18. The method of claim 14 wherein there are provided the further steps of:
    mixing additional mineral aggregate into said mixture; and
    mixing additional water into said mixture.

* * * * *